(12) United States Patent
Zhao et al.

(10) Patent No.: US 9,853,539 B1
(45) Date of Patent: Dec. 26, 2017

(54) SYSTEMS AND METHODS FOR MEASURING INDUCTOR CURRENT IN A SWITCHING DC-TO-DC CONVERTER

(71) Applicant: Cirrus Logic, Inc., Austin, TX (US)

(72) Inventors: Xin Zhao, Austin, TX (US); Ku He, Austin, TX (US); Xiaofan Fei, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 322 days.

(21) Appl. No.: 14/243,261

(22) Filed: Apr. 2, 2014

Related U.S. Application Data

(60) Provisional application No. 61/809,497, filed on Apr. 8, 2013.

(51) Int. Cl.
*H02M 3/156* (2006.01)
*H02M 3/04* (2006.01)

(52) U.S. Cl.
CPC ............. *H02M 3/04* (2013.01); *H02M 3/156* (2013.01)

(58) Field of Classification Search
CPC .. H02M 3/1584; H02M 3/1588; H02M 3/156; H02M 3/1563; H02M 3/158; H02M 2001/0003; H02M 2001/0006; H02M 2001/0009; H02M 2001/0012; H02M 5/293; H02M 5/157; H02M 5/083; Y02B 70/1466
See application file for complete search history.

(56) References Cited

U.S. PATENT DOCUMENTS

| 5,081,379 A | 1/1992 | Korteling |
| 6,879,136 B1 * | 4/2005 | Erisman ................ H02M 3/156 323/224 |

(Continued)

FOREIGN PATENT DOCUMENTS

| EP | 1309077 A2 | 5/2003 |
| EP | 1593195 B1 | 9/2012 |

OTHER PUBLICATIONS

Rodriguez, Miguel, Lopez, Victor Manuel, Azcondo, Francisco J., Sebastian, Javier, Maksimovic, Dragan, Average Inductor Current Sensor for Digitally Controlled Switched-Mode Power Supplies, IEEE Transactions on Power Electronics, vol. 27, No. 8, Aug. 2012, pp. 3795-3806.

(Continued)

*Primary Examiner* — Timothy J Dole
*Assistant Examiner* — Shahzeb K Ahmad
(74) *Attorney, Agent, or Firm* — Jackson Walker L.L.P.

(57) ABSTRACT

A switch control circuit may be utilized for a sequence of switching events occurring in an order of a first event, a second event, a third event, and a fourth event: the first event to activate the first switch and deactivate the second switch wherein an inductor current increases during the first event and has a positive value at an end of the first event, the second event to deactivate the first switch and activate the second switch wherein the switch control circuit maintains the current above zero during the second event, the third event to activate the first switch and deactivate the second switch, and the fourth event to deactivate the first switch and activate the second switch wherein the current decreases to a value below zero at an end of the fourth event and when the current reaches zero, a zero crossing time point is defined.

37 Claims, 5 Drawing Sheets

(56) References Cited

U.S. PATENT DOCUMENTS

| | | | | |
|---|---|---|---|---|
| 7,872,456 B2* | 1/2011 | Li | ...................... | H02M 3/1588 323/224 |
| 7,888,925 B2* | 2/2011 | Dequina | ................ | H02M 1/38 323/229 |
| 8,125,805 B1 | 2/2012 | Melanson | | |
| 2006/0220623 A1* | 10/2006 | Andruzzi | .............. | H02M 3/157 323/276 |
| 2011/0193495 A1* | 8/2011 | Mishima | ............ | H02M 3/1588 315/307 |
| 2011/0241641 A1* | 10/2011 | Chen | .................. | H02M 3/1588 323/284 |
| 2011/0291632 A1* | 12/2011 | Yu | ........................ | H02M 3/158 323/283 |
| 2012/0217946 A1* | 8/2012 | Ju | ........................ | H02M 3/156 323/285 |
| 2015/0155778 A1* | 6/2015 | Kurokawa | ............ | H02M 3/156 323/235 |

OTHER PUBLICATIONS

Chan, Man Pun, Mok, Philip K., On-Chip Digital Inductor Current Sensor for Monolithic Digitally Controlled DC-DC Converter, IEEE Transactions on Circuits and Systems—I: Regular Papers, vol. 60, No. 5, May 2013, pp. 1232-1240.

* cited by examiner

SYSTEMS AND METHODS FOR MEASURING INDUCTOR CURRENT IN A SWITCHING DC-TO-DC CONVERTER

RELATED APPLICATIONS

The present disclosure claims priority to U.S. Provisional Patent Application Ser. No. 61/809,497, filed Apr. 8, 2013, which is incorporated by reference herein in its entirety.

FIELD OF DISCLOSURE

The present disclosure generally relates to switching circuits, and, more particularly, to systems and methods for measuring an inductor current in a synchronous switching direct current-to-direct current (DC-DC) converter for converting a source of DC power supply from one voltage level to another voltage level.

BACKGROUND

Many electronic devices on the market today often use power converters to convert electric energy from one form to another (e.g., converting between alternating current and direct current), converting a voltage or current of an electrical signal, modifying a frequency of an electrical signal, or some combination of the above. Examples of power converters may include boost converters and buck converters. Such power converters are often used to convert an input voltage for other circuitry, wherein such converted voltage is greater than (e.g., if a boost converter is used) or less than (e.g., if a buck converter is used) the input voltage. A switching direct current-to-direct current (DC-DC) converter is a type of electronic circuit that converts a source of power from one DC voltage level to another DC voltage level. Examples of such switching DC-DC converters include but are not limited to a boost converter, a buck converter, a buck-boost converter, an inverting buck-boost converter, and other types of switching DC-DC converters.

FIG. 1A illustrates an example synchronous switching DC-DC buck converter 100, as is known in the art. Buck converter 100 may include a switch 1, a switch 2, an inductor 104, and a capacitor 106 coupled in the manner shown in FIG. 1A. When switch 1 is closed, an input voltage supply 102 may provide a DC voltage to inductor 104, and when switch 2 is closed, an inductor 104 may discharge to a ground voltage. In typical operation, a switch control circuit controls the turn-on times and turn-off times of switches 1 and 2, and a current is maintained in inductor 104 to transfer energy from the input voltage supply 102 to the output voltage 108, such that output voltage 108 is smaller than the input voltage of input voltage supply 102.

FIG. 1B illustrates an example synchronous switching DC-DC boost converter 100B, as is known in the art. Boost converter 100B may include a switch 1B, a switch 2B, an inductor 104B, and a capacitor 106B coupled in the manner shown in FIG. 1B. An input voltage supply 102B may provide a DC input voltage to boost converter 100B, and in typical operation, a switch control circuit may control the turn-on times and turn-off times of switches 1B and 2B in order to maintain a current in inductor 104B to transfer energy from the input voltage 102B to the output voltage 108B, such that output voltage 108B is larger than the input voltage of input voltage supply 102B.

In order to correctly control switching of the switches shown in the converters of FIGS. 1A and 1B (e.g., buck converter 100 and boost converter 100B), and thus provide a desired output voltage (e.g., 108, 108B), the current through the inductor (e.g., 104, 104B) of the converter may need to be measured. In addition, measurement of current through the inductor of a converter may be used for other purposes, including compensation, operating mode detection, or inductor over-current detection. Example measurement techniques, as are known in the art, are illustrated in FIGS. 2A through 2C for measuring an inductor current in a buck converter. Similar and analogous measurement techniques, although not illustrated herein, may also be applied to other types of converters, including a boost converter, buck-boost converter, and inverted buck-boost converter.

FIG. 2A illustrates an example switching DC-DC converter topology 200A, as is known in the art. As shown in FIG. 2A, topology 200A may include a precision voltage measurement circuit 202A and a resistor 204A. Switching DC-DC converter topology 200A may be similar in topology to buck converter 100 except that a resistor 204A with a known resistance may be coupled in series with inductor 104. Precision voltage measurement circuit 202A may be coupled to resistor 204A as shown in FIG. 2A to measure a voltage across resistor 204A. From the measured voltage across resistor 204A, the current through inductor 104 may be calculated. However, there may be disadvantages with the measurement technique depicted in FIG. 2A. One disadvantage may be power loss through resistor 204A. Another drawback is that precision voltage measurement circuit 202A may require precision analog circuitry in order to obtain accurate measurements, and thus, measuring the voltage across resistor 204A requires a separate precision analog circuit that involves high precision voltage measurements, which may add cost and complexity to a system.

FIG. 2B illustrates another example switching DC-DC converter topology 200B, as is known in the art. As shown in FIG. 2B, topology 200B may include a precision voltage measurement circuit 202B, a resistor 204B, and a capacitor 206. Switching DC-DC converter topology 200B may be similar in topology to buck converter 100 except that a resistor and capacitor network comprising resistor 204B and capacitor 206B may be coupled in parallel to inductor 104 as shown in FIG. 2B. Precision voltage measurement circuit 202B may be coupled to capacitor 206 as shown in FIG. 2B to measure a voltage across capacitor 206. As may be recognized by those of skill in the art, a voltage across capacitor 206 may be proportional to the inductor current through inductor 104. However, there may be disadvantages with the measurement technique depicted in FIG. 2B. For example, a resistor-capacitor network used in topology 200B may require a large integrated circuit area. Another disadvantage may be that resistor 204B and capacitor 206 of the resistor-capacitor network and their respective impedances may be susceptible to manufacturing process variations, which in turn may lead to inaccurate measurements.

FIG. 2C illustrates another example switching DC-DC converter topology 200C, as is known in the art. As shown in FIG. 2C, topology 200C may include a switch current measurement circuit 202C. Switching DC-DC converter topology 200C may be similar in topology to buck converter 100 except that switch current measurement circuit 202C may be coupled inline between input voltage source 102 and switch 1 as shown in FIG. 2C. Accordingly, switch current measurement circuit 202C may measure a current carried through switch 1. As may be recognized by those of skill in the art, the current through inductor 104 is the same as the current through switch 1 when switch 1 is closed. However, there may be disadvantages with the measurement technique depicted in FIG. 2C. For example, in many implementations, switch current measurement circuit 202C may be an analog circuit that may be susceptible to large errors in its measurements and may also consume relatively large amounts of power (e.g., may consume current in the order of a few hundred micro-amps). In addition, in implementation when a switching control circuit provides digital control of switching DC-DC converter topology 200C, the inductor current signal through inductor 104 may first need to be converted to a digital signal before it is used by the switching control circuit. Accordingly, this measurement approach may require an analog-to-digital converter ("ADC") to convert the analog signals to digital signals, which may consume a relatively large amount of power.

FIG. 3 illustrates an example inductor current waveform 300 for switching DC-DC converter (e.g., converter 100, converter 100B) operating in continuous conduction mode ("CCM"), as is known in the art. As seen in FIG. 3, the inductor current is periodic with a switching period T. To regulate an output voltage (e.g., 108), a switch control circuit causes a first switch (e.g., switch 1) to close to for a time ton1 while causing a second switch (e.g., switch 2) to remain open, after which the switch control circuit causes the second switch to close for a time ton2 while causing the first switch to remain open, such that T=ton1+ton2. An output voltage Vout (e.g., output voltage 108) and an input voltage Vin (e.g., provided by input voltage source 102) may, in a buck converter, satisfy the relationship Vout/Vin=ton1/(ton1+ton2).

SUMMARY

In accordance with the teachings of the present disclosure, certain disadvantages and problems associated with measuring an inductor current in a switching DC-DC converter may be reduced or eliminated.

In accordance with embodiments of the present disclosure, a method of operating a DC-DC switch converter may include operating the DC-DC switch converter in a continuous conduction mode, wherein the DC-DC switch converter includes a switch control circuit that controls a first switch and a second switch. The method may also include sensing an inductor current of an inductor coupled to the first switch and the second switch. The method may further include utilizing the switch control circuit for a sequence of switching events wherein the switching events are events that occur in an order of a first event, a second event, a third event, and a fourth event for performing the first event to activate the first switch and deactivate the second switch wherein the inductor current increases during the first event and has a positive value at an end of the first event, performing the second event to deactivate the first switch and activate the second switch wherein the switch control circuit maintains the inductor current above zero during the second event, performing the third event to activate the first switch and deactivate the second switch, and performing the fourth event to deactivate the first switch and activate the second switch wherein the inductor current decreases to a value below zero at an end of the fourth event and when the inductor current reaches zero, a zero crossing time point is defined. The method may additionally include measuring a time period from the zero crossing time point relative to a time point within the sequence of switching events.

In accordance with these and other embodiments of the present disclosure, a DC-DC switch converter may include a switch control circuit, an inductor, a sensor, and a capacitor. The switch control circuit may be coupled to a first switch and a second switch for controlling the first switch and the second switch and operating the DC-DC switch converter in a continuous conduction mode. The inductor may be coupled to the first switch and the second switch. The sensor may be coupled to the inductor for sensing an inductor current. The capacitor may be capable of being coupled in parallel with a load and coupled to the inductor wherein the capacitor provides an output for the DC-DC switch converter. The switch control circuit may utilize a sequence of switching events wherein the switching events are events that occur in an order of a first event, a second event, a third event, and a fourth event for: performing the first event to activate the first switch and deactivate the second switch wherein the inductor current increases during the first event and has a positive value at an end of the first event, performing the second event to deactivate the first switch and activate the second switch wherein the switch control circuit maintains the inductor current above zero during the second event, performing the third event to activate the first switch and deactivate the second switch, performing the fourth event to deactivate the first switch and activate the second switch wherein the inductor current decreases to a value below zero at an end of the fourth event and when the inductor current reaches zero, a zero crossing time point is defined, and measuring a time period from the zero crossing time point relative to a time point within the sequence of switching events.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
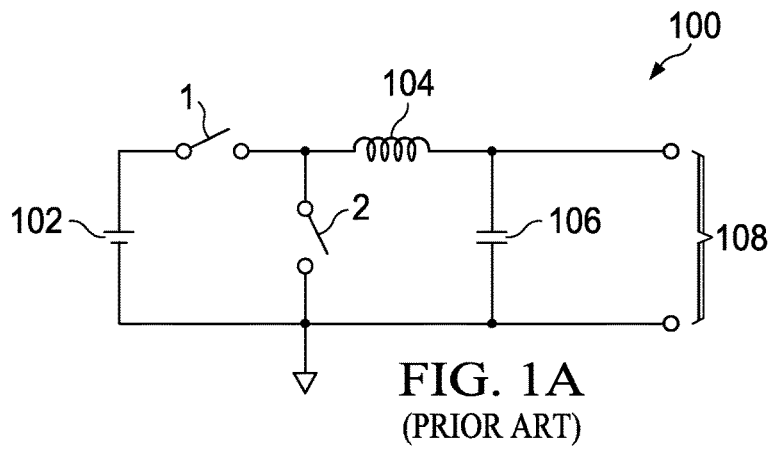
FIG. 1A illustrates an example synchronous switching DC-DC buck converter, as is known in the art.
Figure 1B:
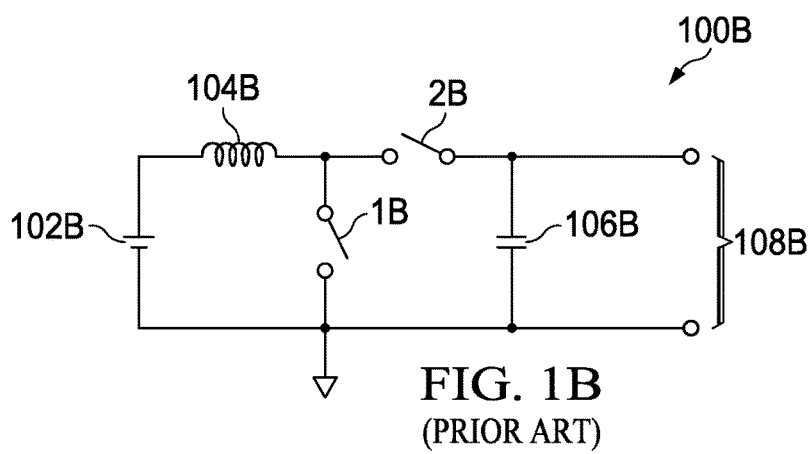
FIG. 1B illustrates an example synchronous switching DC-DC boost converter, as is known in the art.
Figure 2A:
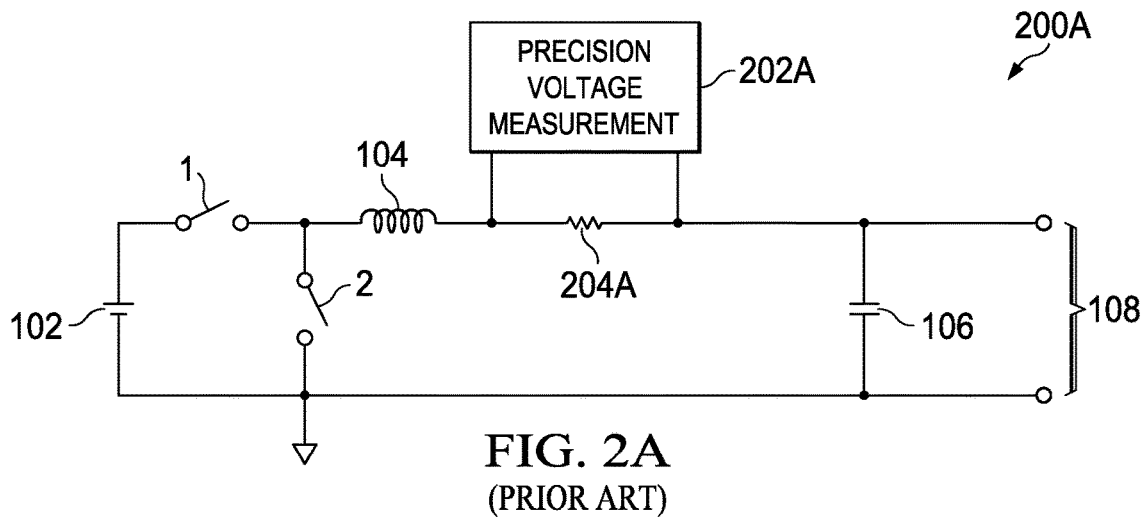
FIG. 2A illustrates an example switching DC-DC converter topology, as is known in the art.
Figure 2B:
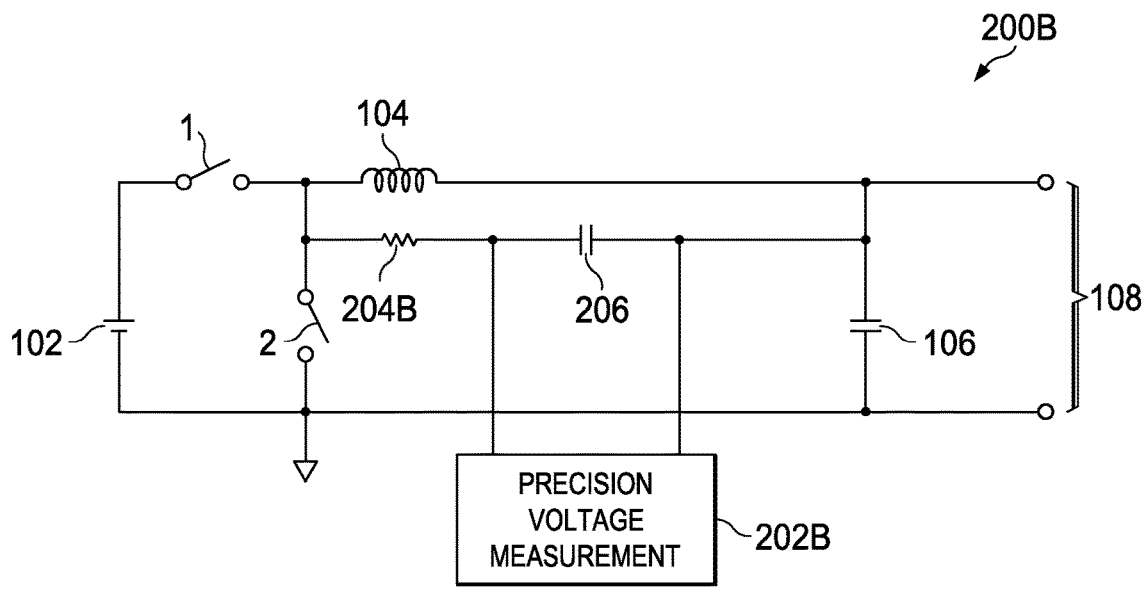
FIG. 2B illustrates another example switching DC-DC converter topology, as is known in the art.
Figure 2C:
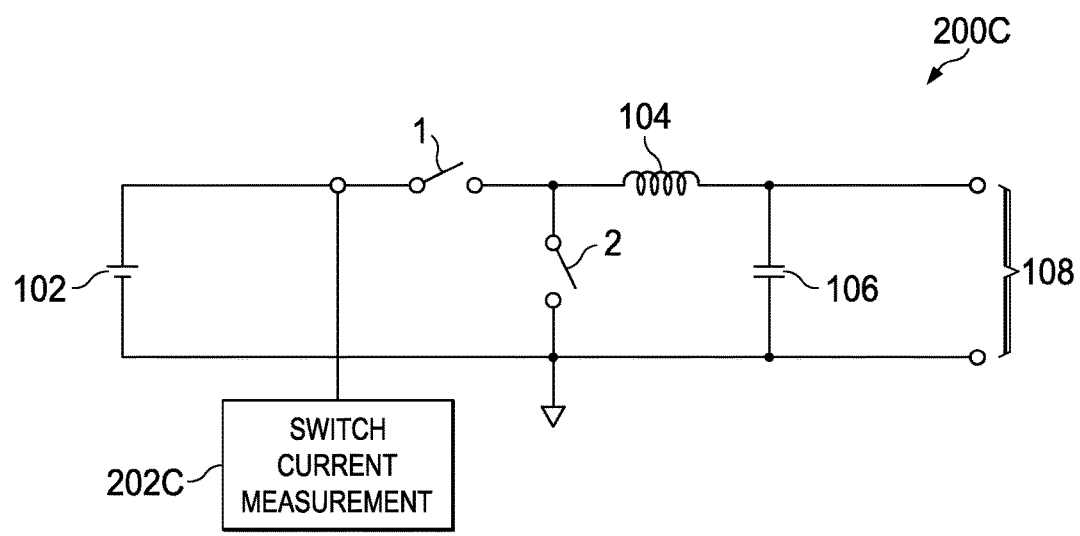
FIG. 2C illustrates another example switching DC-DC converter topology, as is known in the art.
Figure 3:
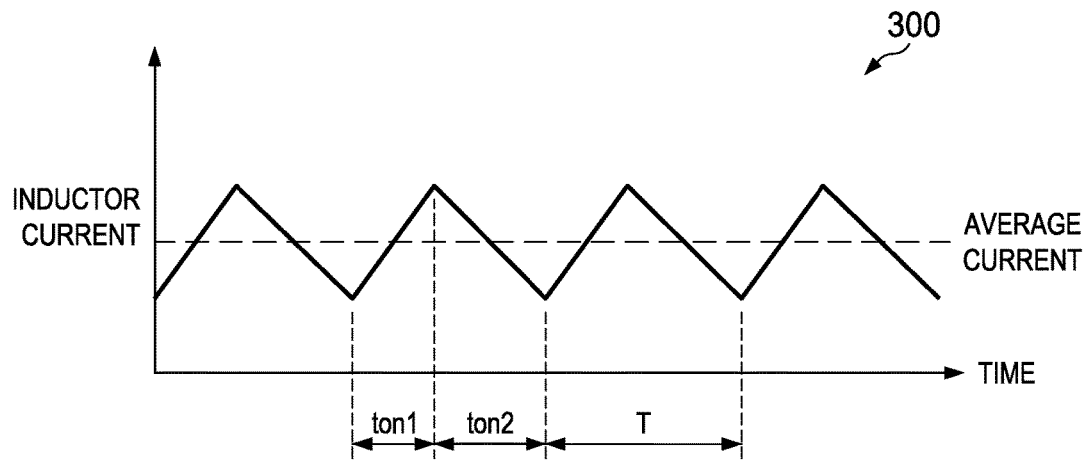
FIG. 3 illustrates an example inductor current waveform for a switching DC-DC converter operating in continuous conduction mode, as is known in the art.
Figure 4:
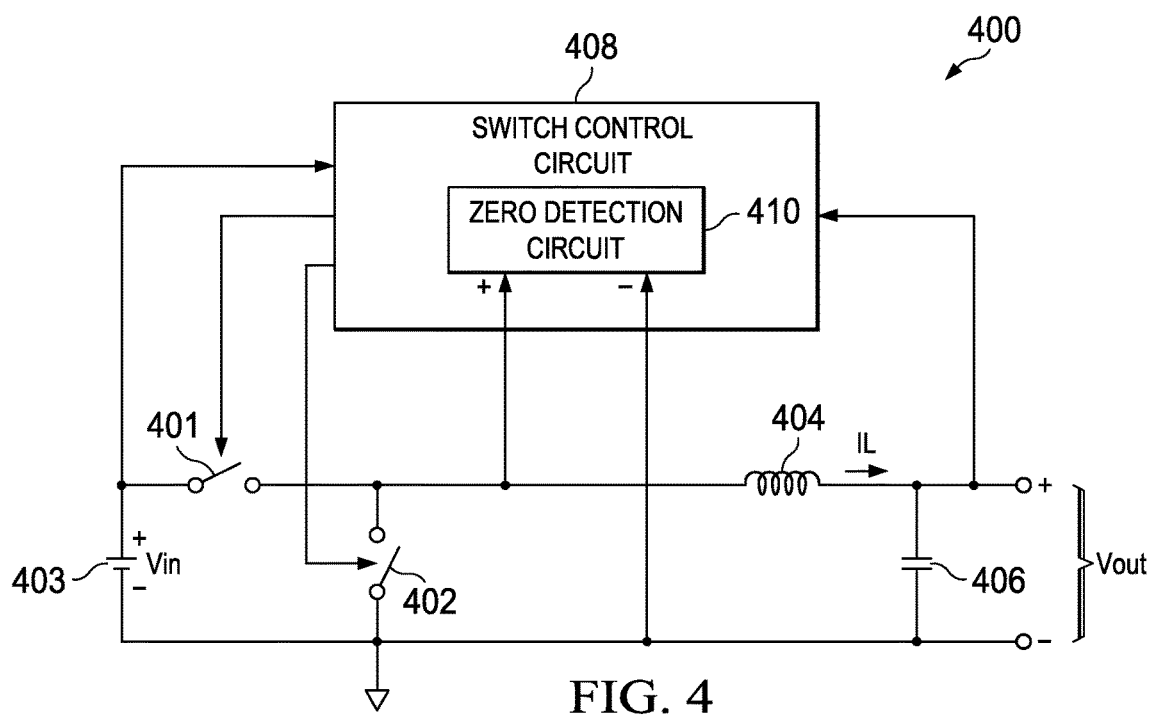
FIG. 4 illustrates an example synchronous switching DC-DC buck converter topology, in accordance with the present disclosure.

FIG. 4 illustrates an example synchronous switching DC-DC buck converter topology 400, in accordance with the present disclosure. Buck converter topology 400 may include a DC-DC buck converter comprising a switch 401, a switch 402, an inductor 404, and a capacitor 406 coupled in the manner shown in FIG. 4. Buck converter topology 400 may also include an input voltage source 403 configured to provide an input voltage Vin to the buck converter, and a switch control circuit 408 configured to measure an inductor current IL through inductor 404 in the direction of capacitor 406 and configured to control switches 401 and 402. In operation, switch control circuit 408 may cyclically deactivate (e.g., open) and activate (e.g. close) switches 401 and 402 and control the durations of time each switch 401 and 402 are deactivated and activated in order to maintain a current in inductor 404 to transfer energy from input voltage source 403 to capacitor 406, such that output voltage Vout is a DC voltage smaller than input voltage Vin provided by input voltage source 403.

As described above and elsewhere in this disclosure, switch control circuit 408 may be utilized to perform a current measurement of inductor current IL. Because switch control circuit 408 may require no additional measurement circuit beyond that typically present in a switch control circuit, the concerns of excess power consumption and additional circuit area present in traditional measurement approaches may be reduced or eliminated. In addition, measurement of inductor current IL by switch control circuit 408 in accordance with this disclosure may reduce or eliminate the sensitivity to manufacturing process variations present in traditional measurement approaches. Although this disclosure contemplates operation of switch control circuit 408 with respect to the buck converter circuit of FIG. 4, identical, similar, or analogous operation may be used for switch control and current measurement of other converter circuits, including without limitation a boost converter, a buck-boost converter, and an inverted buck-boost converter.

Figure 5A:
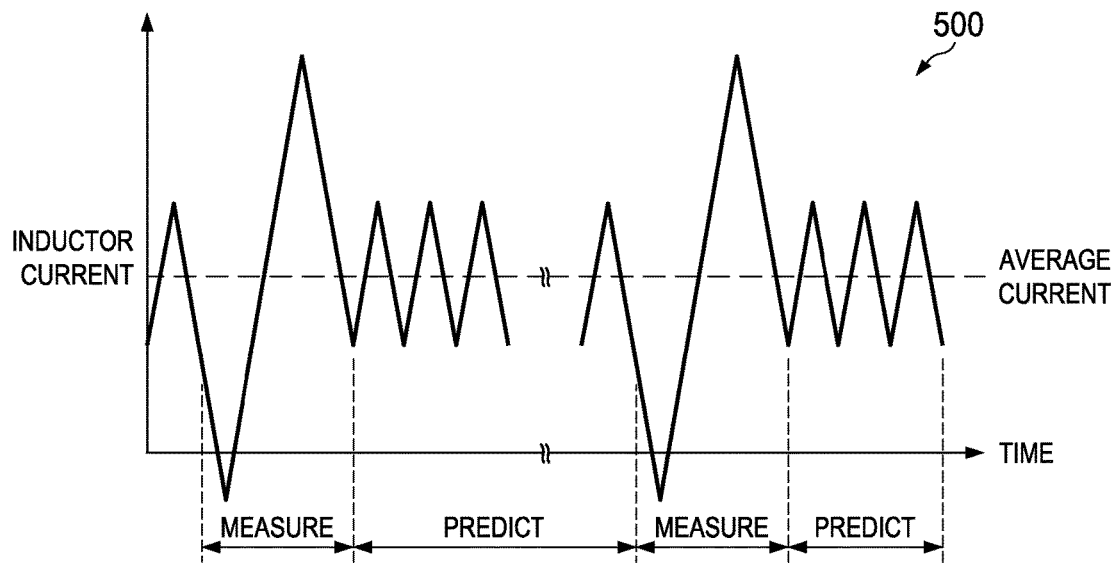
FIG. 5A illustrates an example inductor current waveform for a switching DC-DC converter operating in continuous conduction mode, in accordance with embodiments of the present disclosure.
Figure 5B:
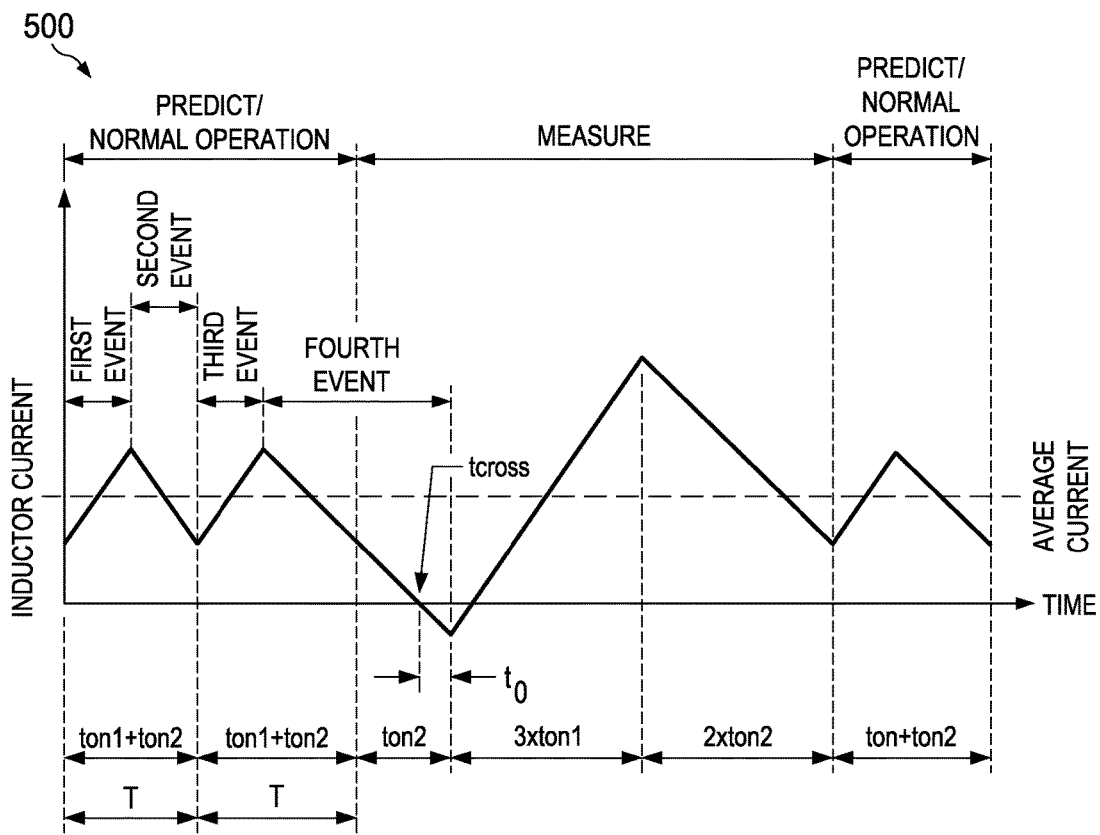
FIG. 5B further illustrates the example inductor current waveform of FIG. 5A with additional detail showing switching occurring during a measurement phase, in accordance with embodiments of the present disclosure.

Switch control circuit 408 may conduct a two-phase operation for a switching converter in order to determine inductor current IL. One phase of operation may comprise a current measurement phase while the other phase of operation may comprise a current prediction phase, as illustrated in FIGS. 5A and 5B. FIG. 5A illustrates an example inductor current waveform 500 for a switching DC-DC converter operating in CCM, in accordance with embodiments of the present disclosure. In FIG. 5A, inductor current IL is plotted against time. The amount of time that switch control circuit 408 causes a switching converter to operate in the measurement and prediction phases may be predetermined (e.g., by a manufacturer, vendor, or other provider of switch control circuit 408). These predetermined time periods for the measurement phase and the prediction phase, respectively labeled "measure" and "predict" in FIG. 5A, may be based on the characteristics of the components used for the switching converter controlled by switch control circuit 408. During the measurement phase, switch control circuit 408 may measure inductor current IL while during the prediction, a prediction methodology or algorithm may be used to predict inductor current IL between two measurement phases, as described in greater detail elsewhere in this disclosure. Throughout operation of switch control circuit 408, switch control circuit 408 may maintain an average current for inductor current IL, as shown in FIG. 5A.

FIG. 5B further illustrates example inductor current waveform 500 with additional detail showing switching occurring during a measurement phase, in accordance with embodiments of the present disclosure. Within a first time period labeled in FIG. 5B as "predict/normal operation," switch control circuit 408 may control a switching converter (e.g., the buck converter depicted in FIG. 4) in a normal operational manner for operating the switching converter in CCM. That is, switch control circuit 408 may activate switch 401 for turn-on time ton1 while deactivating switch 402, and then activate switch 402 for turn-on time ton2 while deactivating switch 401. After the first time period labeled "predict/normal operation" and at the start of the measurement phase labeled as "measure" in FIG. 5B, switch control circuit 408 may leave switch 402 activated for a second turn-on time ton2, and may leave switch 402 activated for a first duration equal to K times the number of turn-on time(s) ton2 until switch control circuit 408 detects that inductor current IL has crossed zero, where K is an integer or a half-integer value (e.g., 0.5, 1, 1.5, 2, etc.). To detect the zero crossing of current IL, switch control circuit 408 may include a zero detection circuit 410. Zero detection circuit 410 may comprise any system, device, or apparatus (e.g., a comparator) that detects when inductor current IL has crossed zero. For example, in some embodiments, zero detection circuit 410 may measure a voltage across switch 402, which may be proportional to inductor current IL when switch 402 is closed, to detect the zero crossing of inductor current IL by determining when the voltage across switch 402 crosses zero.

Inductor current IL may cross zero during the first duration at a time tcross, such that time tcross occurs a time t0 prior to the end of the first duration. When switch control circuit 408 detects that inductor current IL has crossed zero, switch control circuit 408 may wait through the completion of the turn-on time ton2 in which the zero crossing occurs, and then may deactivate switch 402 and activate switch 401. Switch control circuit 408 may activate switch 401 for a second duration equal to the turn-on time ton1 multiplied by the quantity 2 times K plus 1 (2×K+1). At the end of the second duration, switch control circuit 408 may deactivate switch 401 and activate switch 402 for a third duration equal to the turn-on time ton2 multiplied by the quantity K plus 1 (K+1), after which switch control circuit 408 may again operate the switching converter in its normal operation (e.g., the second time period labeled "predict/normal operation" in FIG. 5B). By controlling switches 401 and 402 in this manner, switch control circuit 408 may maintain the average current of inductor current IL approximately equal to what such average current would be in the absence of the measurement phase. In other words, during the measurement phase, inductor current IL may be measured by inserting a different or special switching sequence among the normal switching cycles. To measure inductor current IL, switch control circuit 408 can generate the following example switching algorithm sequence of operations A through C for a given integer N, wherein N=2×K (FIG. 5B shows inductor current waveform 500 for a current measurement sequence in accordance with the operations below in which N=2):

A. Activate switch 402 for first duration N/2×ton2 and deactivate switch 401.
B. Deactivate switch 402 and activate switch 401 for a second duration (N+1)×ton2.
C. Deactivate switch 401 and activate switch 402 for a third duration (N/2+1)×ton2.

In accordance with this example switching algorithm, a measurement phase comprising the above sequence of steps A through C may take a period (N+1)×T to complete, wherein T is the time period of the inductor current waveform in the prediction/normal operation phase, and may maintain the same approximate average of inductor current IL as in the prediction/normal operation phase. The sequence A through C above may allow an inductor current measurement ranging from 1/2×ton2×Vout/L to (N/2+1/2)×ton2×Vout/L, wherein L is the inductance of inductor 404. The voltage ripple in a measurement phase comprising the sequence A through C above may be equal to the quantity 2(N+1) multiplied by the ripple in the prediction/normal operation phase. Such inductor current may be measured as an average current Im given by the equation Im=(t0+ton2/2)×Vout/L.

Stated yet another way, a switch control circuit (e.g., switch control circuit 408) may operate a DC-DC switch converter (e.g., the buck converter depicted in FIG. 4), wherein the switch converter has a first switch (e.g., switch 401) and a second switch (e.g., switch 402) and sense a current (e.g., IL) of an inductor (e.g., inductor 404) coupled to the first switch and the second switch. The switch control circuit may perform a sequence of switching events occurring in the order of a first event, a second event, a third event, and a fourth event, as such events are labeled in FIG. 5B. During the first event, the switch control circuit may activate the first switch and deactivate the second switch such that the inductor current increases during the first event and has a positive value at an end of the first event. The first event may occur during a first turn-on time period (e.g., period ton1 of the prediction/normal operation phase). During the second event, the switch control circuit may deactivate the first switch and activate the second switch such that the switch control circuit maintains the inductor current above zero during the second event. The second event may occur during a second turn-on time period (e.g., period ton2 of the prediction/normal operation phase). During the third event (e.g., another period ton1 of the prediction/normal operation phase), the switch control circuit may activate the first switch and deactivate the second switch. During the fourth event (e.g., during the cumulative period of another period ton2 of the prediction/normal operation phase and the first duration of the measurement phase), the switch control circuit may deactivate the first switch and activate the second switch such that the inductor current decreases to a value below zero at an end of the fourth event and when the inductor current reaches zero, a zero crossing time point (e.g., tcross) is defined (e.g., based on sensing of zero crossing of the current by zero detection circuit 410). The switch control circuit may also measure a time period (e.g., t0) from the zero crossing time point relative to a time point (e.g., end of the fourth event/end of the first duration of the measurement phase) within the sequence of switching events.

During the fourth event, the switch control circuit may activate the second switch for a period of time (e.g., first duration of measurement phase) wherein the inductor current decreases to a value below zero. The switch control circuit may activate the second switch for the period of time (e.g., first duration of measurement phase), such that it maintains the second switch as activated for an additional time period that is a multiple (e.g., K) of the second turn-on time period (e.g., ton2), wherein the multiple can be either an integer or a half integer and the additional time period ensures the inductor current decreases to a value below zero. During the fourth event. the switch control circuit may also detect the zero crossing time point for the inductor current. During the fourth event, after detecting the zero crossing time point, the switch control circuit may further control the first switch and the second switch so that the average inductor current is maintained (e.g., further operate switching in the second and third durations of the measurement phase in order to maintain the average inductor current). Further control of the first switch and the second switch may include activating the first switch for a first time period (e.g., the second duration of the measurement phase) that equals a product of the multiple times two plus one (e.g., 2K+1) and the first turn-on time period while the second switch is deactivated and activating the second switch for a second time period (e.g., the third duration of the measurement phase) that equals a product of the multiple plus one (e.g., K+1) and the second turn-on time period while the first switch is deactivated.

To measure a time period from the zero crossing time point, the switch control circuit may measure the time period from the zero crossing time point to an end of a first occurrence of the second turn-on time period during the fourth event (e.g., the end of the first duration of the measurement phase). In addition, to determine an average inductor current within a DC-DC switch converter, the switch control circuit may derive the average inductor current by using the time period, the second turn-on time period, an output voltage of the DC-DC switch converter, and an inductance value of the inductor (e.g., Im=(t0+ton2/2)×Vout/L).

Figure 6:
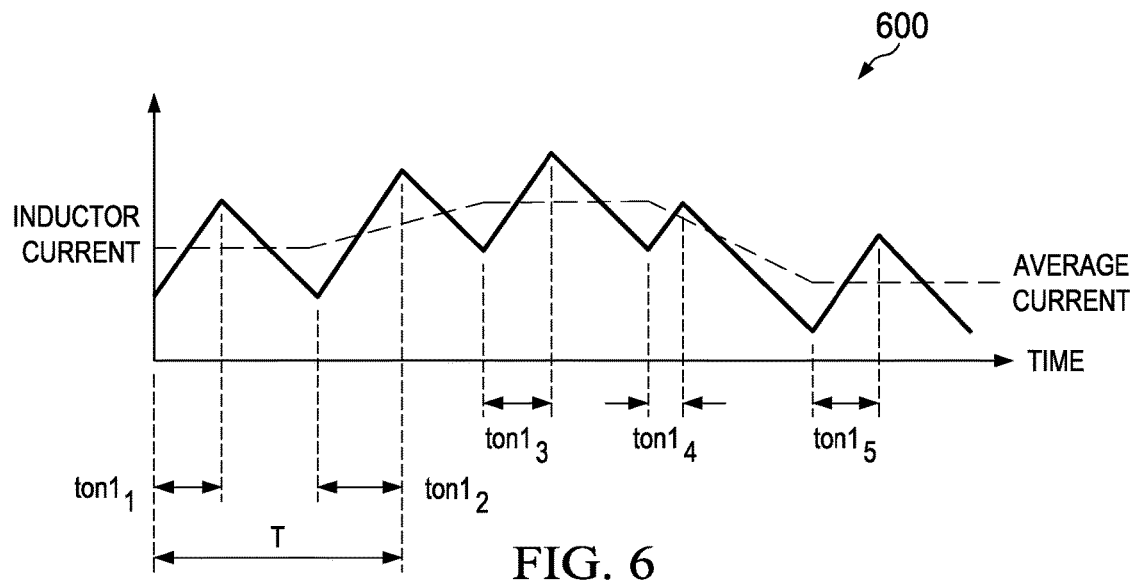
FIG. 6 further illustrates the example inductor current waveform of FIG. 5A with additional detail showing switching occurring during a prediction phase, in accordance with embodiments of the present disclosure.

FIG. 6 further illustrates the example inductor current waveform 500 of FIG. 5A with additional detail showing a waveform portion 600 of waveform 500 occurring during a prediction phase. During the prediction phase, a switching converter (e.g., the buck converter depicted in FIG. 4) may operate in a normal operational manner. In the prediction phase, switch control circuit 408 may predict an average of inductor current IL based on the measured average current from the previous measurement phase, and by determining how long switch 401 is activated during the prediction phase. The predicted average inductor current may be higher for larger turn-on times ton1 and lower for smaller turn-on times ton1. For example, as shown in FIG. 6, turn-on times $ton1_1$, $ton1_2$, $ton1_3$, $ton1_4$, and $ton1_5$ have varying time lengths and may result in the prediction of respective varying average inductor currents. As a specific example, average inductor current I of a jth switching period in the prediction phase can be predicted by the equation $I=Im+Vout \times T \times M/L \times \Sigma_{n=1 \ldots j}(ton1_n/T-M)$ wherein:

$M = Vout/Vin$;

Im is the average inductor current as measured from the previous measurement phase;
T is the period of the inductor current waveform;
L is the inductance value of the inductor (e.g., inductor 404);
n is an integer representing the first through jth switching period within the prediction phase; and
$ton1_n$ is the turn-on time of switch 1 for the nth switching period.

This inductor current calculation may be based on the change of average inductor current in each switching period of the prediction phase, and this relationship is illustrated in the portion 600 of inductor current waveform 500 shown in FIG. 6.

Figure 7:
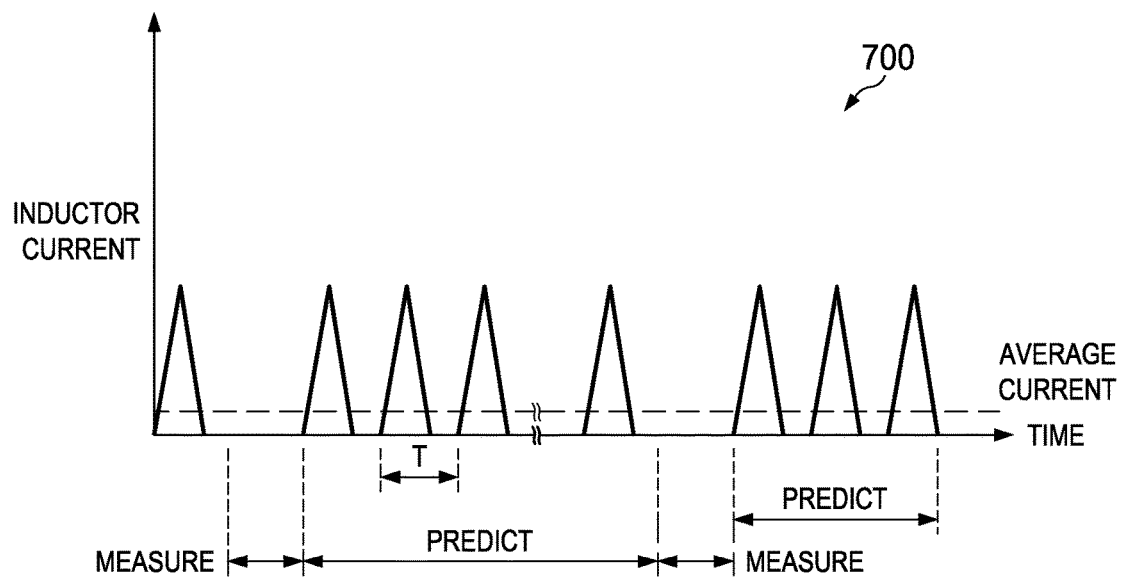
FIG. 7 illustrates an example inductor current waveform for a switching DC-DC converter operating in discontinuous conduction mode, in accordance with embodiments of the present disclosure.

FIG. 7 illustrates an example inductor current waveform 700 for a switching DC-DC converter operating in discontinuous conduction mode ("DCM"), in accordance with embodiments of the present disclosure. In particular, example inductor current waveform 700 illustrates an example sequence of measurement phases and prediction phases for a switching converter (e.g., buck converter depicted in FIG. 4) operating in DCM. During the measurement phases, switches 401 and 402 may not be used and thus may be deactivated, and output voltage Vout of the switching converter may be measured and used instead to calculate inductor current IL. For example, in the measurement phase, the inductor current IL may be measured by deactivating both switches 401 and 402 for N switching periods, where N is a given integer, and by measuring output voltage Vout of the switching converter. The average inductor current Im of inductor 404 may be calculated by the equation Im=C×ΔVout/N/T wherein C is the capacitance of an output capacitor (e.g., capacitor 406), T is the period of the inductor current waveform 700; and ΔVout is the output voltage drop caused by the measurement operation. In the prediction phase, the average inductor current I may be predicted in accordance with the equation I=ton1²×(Vin²/Vout−Vin)/2L/T wherein ton1 is the turn-on time in which switch 401 is activated, T is the period of the inductor current waveform 700, and L is the inductance value of inductor 404.

The above-mentioned systems and methods may be used to implement an over-current detection for a switching DC-DC converter, for example the buck converter depicted in FIG. 4, that are utilized in low power codecs. As an example, N can be chosen to be two (2) to provide an inductor current limit of one and a half (1.5) times the designed maximum average inductor current. In addition to inductor over-current protection, the above mentioned apparatus and method can also be used for other purposes as well (e.g., peak detection of inductor current, inductance measurement of an inductor of the switching DC-DC converter, etc.). The above-mentioned systems and methods are not limited to a particular type of switching DC-DC converter and can also be used in other low power switching DC-DC converter topologies and configurations.

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosures have been described in detail, it should be understood that various changes, substitutions, and alterations could be made hereto without departing from the spirit and scope of the disclosure.

What is claimed is:

1. A method of operating a direct current-to-direct current (DC-DC) switch converter, comprising: operating the DC-DC switch converter in a continuous conduction mode, wherein the DC-DC switch converter comprises a switch control circuit that controls a first switch and a second switch; sensing an inductor current of an inductor coupled to the first switch and the second switch; utilizing the switch control circuit for a sequence of switching events wherein the switching events are events that occur in an order of a first event, a second event, a third event, and a fourth event for: performing the first event to activate the first switch and deactivate the second switch wherein the inductor current increases during the first event and has a positive value at an end of the first event; performing the second event to deactivate the first switch and activate the second switch wherein the switch control circuit maintains the inductor current above zero during the second event; performing the third event to activate the first switch and deactivate the second switch; and performing the fourth event to deactivate the first switch and activate the second switch wherein the inductor current decreases to a value below zero at an end of the fourth event and when the inductor current reaches zero, a zero crossing time point is defined, and wherein the first event, the second event, the third event, and the fourth event occur in immediately successive order and are repeated during consecutively successive periods of time; and measuring a time period from the zero crossing time point relative to a time point within the sequence of switching events.

2. The method of claim 1, wherein the DC-DC switch converter is operated to determine an average inductor current within the DC-DC switch converter.

3. The method of claim 2, wherein performing the fourth event to deactivate the first switch and activate the second switch, further comprises:
   activating the second switch for a period of time wherein the inductor current decreases to a value below zero;
   detecting the zero crossing time point for the inductor current; and
   after detecting the zero crossing time point, further controlling the first switch and the second switch so that the average inductor current is maintained.

4. The method of claim 3, wherein detecting the zero crossing time point, further comprises:
   comparing, by a comparator, a voltage across the second switch to detect when the inductor current is zero.

5. The method of claim 4, wherein the comparator is in the switch control circuit.

6. The method of claim 3, wherein:
   when the first switch is activated, the first switch is activated for a first turn-on time period while the second switch is deactivated;

when the second switch is activated, the second switch is activated for a second turn-on time period while the first switch is deactivated; and the first turn-on time and the second turn-on time define a plurality of switching periods, wherein each switching period comprises the first turn-on time period and the second turn-on time period.

7. The method of claim 6, wherein activating the second switch for a period of time, further comprises:
maintaining the second switch as activated for an additional time period that is a multiple of the second turn-on time period, wherein the multiple can be either an integer or a half integer and the additional time period ensures the inductor current decreases to a value below zero.

8. The method of claim 7, wherein after detecting the zero crossing time point, further controlling the first switch and second switch, further comprises:
activating the first switch for a first time period that equals a product of the multiple times two plus one and the first turn-on time period while the second switch is deactivated; and
activating the second switch for a second time period that equals a product of the multiple plus one and the second turn-on time period while the first switch is deactivated.

9. The method of claim 6, wherein:
measuring a time period from the zero crossing time point further comprises:
measuring the time period from the zero crossing time point to an end of a first occurrence of the second turn-on time period during the fourth event; and
operating the DC-DC switch converter to determine an average inductor current within a DC-DC switch converter, further comprises:
deriving the average inductor current by using the time period, the second turn-on time period, an output voltage of the DC-DC switch converter, and an inductance value of the inductor.

10. The method of claim 9, wherein deriving the average inductor current, further comprises:
deriving the average inductor current by multiplying a quotient of the output voltage and the inductance value by a sum of the time period and a half of the second turn-on time period.

11. The method of claim 6, wherein performing the fourth event to deactivate the first switch and activate the second switch further comprises operating the DC-DC switch converter in a measurement phase and further comprises after operating the DC-DC switch converter in a measurement phase, operating the DC-DC switch converter in a prediction phase by:
selecting a jth switching period from an n number of the switching periods wherein jth corresponds to an integer j that is greater than zero and less than or equal to n and wherein n is an integer greater than zero; and
deriving the average inductor current for the jth switching period by using the average inductor current derived in the measurement phase, an output voltage of the DC-DC switch converter, each of the first turn-on time periods for a first switching period through the jth switching period, the switching period, an input voltage of the DC-DC switch converter, and an inductance value of the inductor.

12. The method of claim 11, wherein deriving the average inductor current for the jth switching period, further comprises:
deriving the average inductor current for the jth switching period in accordance with the following equation:

$$Im = Io + Vout \times T \times M/L \times \Sigma_{n=1...j}(ton1_n/T - M);$$ wherein:

Im is the average inductor current for the jth switching period;
Io is the inductor current derived in the measurement phase;
M is equal to Vout/Vin wherein Vout is the output voltage and Vin is the input voltage;
T is the switching period;
L is the inductance value of the inductor; and
$ton1_n$ is each of the first turn-on time periods for a first switching period through the jth switching period.

13. The method of claim 1, wherein the DC-DC switch converter is operated to determine a peak current in the DC-DC switch converter.

14. The method of claim 1, wherein the DC-DC switch converter is operated to determine an inductance of the inductor in the DC-DC switch converter.

15. The method of claim 1, wherein the DC-DC switch converter is operated to measure an input voltage of the DC-DC switch converter.

16. The method of claim 1, wherein polarity of the inductor current is such that the inductor current is positive when flowing from the inductor through the second switch.

17. The method of claim 1, wherein the first event occurs for a first duration of time, the second event occurs for a second duration of time, the third event occurs for the first duration of time, and the fourth event occurs for an integer multiple of the second duration of time.

18. A direct current-to-direct current (DC-DC) switch converter, comprising: a switch control circuit coupled to a first switch and a second switch for controlling the first switch and the second switch in a continuous conduction mode; an inductor coupled to the first switch and the second switch; a sensor coupled to the inductor for sensing an inductor current; a capacitor capable of being coupled in parallel with a load and coupled to the inductor wherein the capacitor provides an output for the DC-DC switch converter; and wherein the switch control circuit utilizes a sequence of switching events wherein the switching events are events that occur in an order of a first event, a second event, a third event, and a fourth event for: performing the first event to activate the first switch and deactivate the second switch wherein the inductor current increases during the first event and has a positive value at an end of the first event; performing the second event to deactivate the first switch and activate the second switch wherein the switch control circuit maintains the inductor current above zero during the second event; performing the third event to activate the first switch and deactivate the second switch; and performing the fourth event to deactivate the first switch and activate the second switch wherein the inductor current decreases to a value below zero at an end of the fourth event and when the inductor current reaches zero, a zero crossing time point is defined, wherein the first event, the second event, the third event, and the fourth event occur in immediately successive order and are repeated during consecutively successive periods of time; and measuring a time period from the zero crossing time point relative to a time point within the sequence of switching events.

19. The apparatus of claim 18, wherein the DC-DC switch converter is a buck converter.

20. The apparatus of claim 18, wherein the DC-DC switch converter is a boost converter.

21. The apparatus of claim 18, wherein the DC-DC switch converter is a buck-boost converter.

22. The apparatus of claim 18, wherein the DC-DC switch converter is an inverting buck-boost converter.

23. The apparatus of claim 18, wherein the DC-DC switch converter is operated to determine an average inductor current within the DC-DC switch converter.

24. The apparatus of claim 23, wherein performing the fourth event to deactivate the first switch and activate the second switch, further comprises:
   activating the second switch for a period of time wherein the inductor current decreases to a value below zero;
   detecting the zero crossing time point for the inductor current; and
   after detecting the zero crossing time point, further controlling the first switch and the second switch so that the average inductor current is maintained.

25. The apparatus of claim 24, wherein the switch control circuit comprises a comparator configured to detect the zero crossing time point by comparing a voltage across the second switch to detect when the inductor current is zero.

26. The apparatus of claim 24, wherein:
   when the first switch is activated, the switch control circuit activates the first switch for a first turn-on time period while the second switch is deactivated;
   when the second switch is activated, the switch control circuit activates the second switch for a second turn-on time period while the first switch is deactivated; and
   the first turn-on time and the second turn-on time define a plurality of switching periods, wherein each switching period comprises the first turn-on time period and the second turn-on time period.

27. The apparatus of claim 26, wherein activating the second switch for a period of time, further comprises:
   maintaining the second switch as activated for an additional time period that is a multiple of the second turn-on time period, wherein the multiple can be either an integer or a half integer and the additional time period ensures the inductor current decreases to a value below zero.

28. The apparatus of claim 27, wherein after detecting the zero crossing time point, further controlling the first switch and second switch further comprises:
   activating the first switch for a first time period that equals a product of the multiple times two plus one and the first turn-on time period while the second switch is deactivated; and
   activating the second switch for a second time period that equals a product of the multiple plus one and the second turn-on time period while the first switch is deactivated.

29. The apparatus of claim 26, wherein:
   measuring a time period from the zero crossing time point further comprises:
      measuring the time period from the zero crossing time point to an end of a first occurrence of the second turn-on time period during the fourth event; and
   operating the DC-DC switch converter to determine an average inductor current within a DC-DC switch converter, further comprises:
      deriving the average inductor current by using the time period, the second turn-on time period, an output voltage of the DC-DC switch converter, and an inductance value of the inductor.

30. The apparatus of claim 29, wherein deriving the average inductor current, further comprises:
   deriving the average inductor current by multiplying a quotient of the output voltage and the inductance value by a sum of the time period and a half of the second turn-on time period.

31. The apparatus of claim 26, wherein performing the fourth event to deactivate the first switch and activate the second switch further comprises operating the DC-DC switch converter in a measurement phase and further comprises after operating the DC-DC switch converter in a measurement phase, operating the DC-DC switch converter in a prediction phase by:
   selecting a jth switching period from an n number of the switching periods wherein jth corresponds to an integer j that is greater than zero and less than or equal to n and wherein n is an integer greater than zero; and
   deriving the average inductor current for the jth switching period by using the average inductor current derived in the measurement phase, an output voltage of the DC-DC switch converter, each of the first turn-on time periods for a first switching period through the jth switching period, the switching period, an input voltage of the DC-DC switch converter, and an inductance value of the inductor.

32. The apparatus of claim 31, wherein deriving the average inductor current for the jth switching period, further comprises:
   deriving the average inductor current for the jth switching period in accordance with the following equation:
   $$Im = Io + Vout \times T \times M/L \times \Sigma_{n=1 \ldots j}(ton1_n/T - M);$$ wherein:

Im is the average inductor current for the jth switching period;
   Io is the inductor current derived in the measurement phase;
   M is equal to Vout/Vin wherein Vout is the output voltage and Vin is the input voltage;
   T is the switching period;
   L is the inductance value of the inductor; and
   $ton1_n$ is each of the first turn-on time periods for a first switching period through the jth switching period.

33. The apparatus of claim 18, wherein the DC-DC switch converter is operated to determine a peak current in the DC-DC switch converter.

34. The apparatus of claim 18, wherein the DC-DC switch converter is operated to determine an inductance of the inductor in the DC-DC switch converter.

35. The apparatus of claim 18, wherein the DC-DC switch converter is operated to measure an input voltage of the DC-DC switch converter.

36. The apparatus of claim 18, wherein polarity of the inductor current is such that the inductor current is positive when flowing from the inductor through the second switch.

37. The apparatus of claim 18, wherein the first event occurs for a first duration of time, the second event occurs for a second duration of time, the third event occurs for the first duration of time, and the fourth event occurs for an integer multiple of the second duration of time.

* * * * *